Nov. 19, 1968    I. L. PHILLIPS ETAL    3,411,238
AERIAL APPLICATION OF AGRICULTURAL CHEMICALS
Filed July 11, 1966
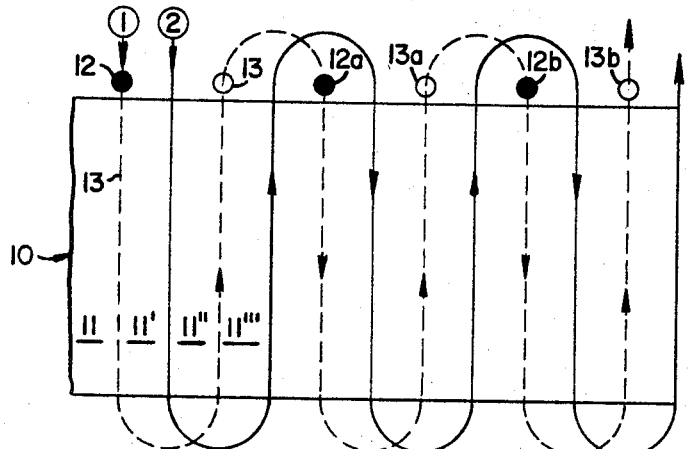
FIG_1
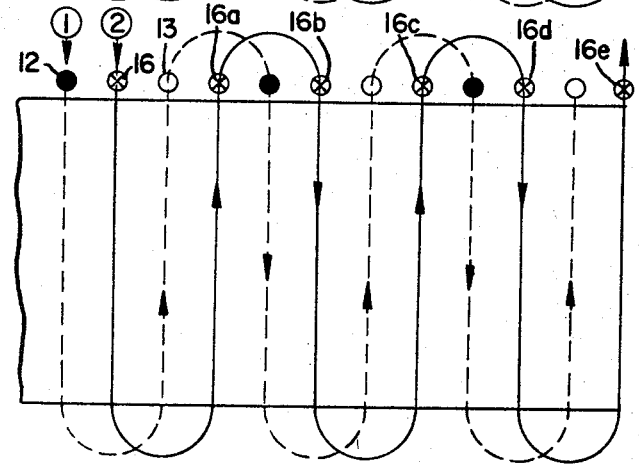
FIG_2
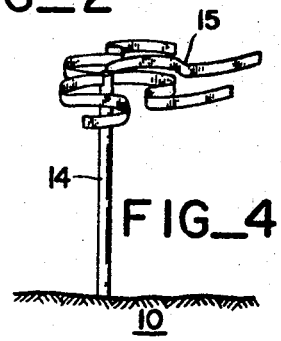
FIG_4
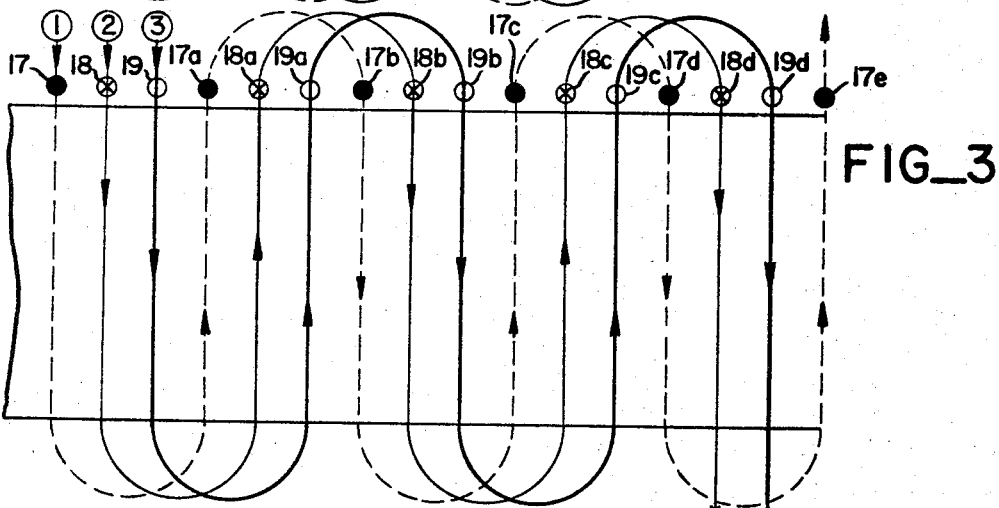
FIG_3
INVENTOR.
IRVINE L. PHILLIPS
BY  WILTON J. SMITH
Townsend & Townsend
ATTORNEYS

United States Patent Office 3,411,238
Patented Nov. 19, 1968

3,411,238
AERIAL APPLICATION OF AGRICULTURAL
CHEMICALS
Irvine L. Phillips, Greenfield, and Wilton J. Smith, Salinas, Calif., assignors to Soilserv, Inc., Salinas, Calif.
Filed July 11, 1966, Ser. No. 564,352
5 Claims. (Cl. 47—58)

This invention relates to the aerial application of agricultural chemicals. More particularly, it relates to an improved method for the application of such chemicals from a suitable aircraft in which semi-permanent ground based visual guides and patterns determinable therefrom are preliminarily established so that the pilot of the aircraft can make a precision coverage of selected areas on the ground.

To date the predominant technique for the application of agricultural chemicals from the air relies solely upon the skill and judgment of the pilot, who must visually align himself with the areas to be treated as he sees fit. While doing so the pilot must pay close attention to operation of the aircraft, which is in close proximity to the ground and obstacles. The result is a frequently erratic and non-uniform coverage even where the pilot is highly skilled and experienced.

Recognizing the serious shortcomings of leaving it entirely to the pilot to align himself with the areas to be treated, such as the missing of some areas completely and the duplication of others, more uniformity has been achieved with the use of a flagman who aligns himself with the appropriate zone to be treated and by means of flags imparts the alignment information to the pilot in the air. As a practical matter, where there are a series of fields to be treated and the fields are at locations some miles apart, the flagman can not be utilized. The aircraft reaches the next field to be treated after completing one virtually without delay, whereas the flagman may require some time to arrive at the second location. Either the plane must land some place and wait for the flagman, or a series of flagmen are required. Either alternative is prohibitively costly.

Even with the flagman, some significant chances for error are introduced. The flagman lines the plane up when the plane is some distance from the field and then moves out of the way so as not to be inundated when the agricultural chemical is released on the field. Consequently, the path is actually flown without having the benefit of a continuous guide to align with during the actual release of the chemicals. Moreover, although the flagman has only to concern himself with proper coverage of the field, and is not occupied with the flying of the plane, there are significant numbers of instances of inaccuracy when the flagman positions himself for signaling the pilot. This is compounded when a series of treatments on different days is contemplated, since this requires that the flagman accurately remember what has been treated and to what extent the treatment has previously been accomplished. Finally, and of some significance from another aspect, the flagman is subjected to serious hazards by his presence in the field during a passage over the field by the plane. Many of the chemicals released from the plane are quite toxic and may reach the flagman despite precautions. In addition, the plane flies so low that the wheels of the plane have been known to strike and seriously injure the man in the field.

In the accompanying drawings:

FIGS. 1–3 illustrate schematically three embodiments of the present method for aerial application, showing the method of establishing markers for use by the pilot in selecting the path to be flown and the paths traversed by the pilot in accordance with the markers.

FIG. 4 shows one type of marker which may be utilized in connection with the present method.

In the present method, the surface of the field to be treated is suitably measured or otherwise handled so as to designate a plurality of parallel strips of substantially uniform width. A series of markers which can be easily identified by the pilot in the air is placed at the edge of the field in line with the boundary lines between adjoining ones of said parallel strips. A second series of markers also distinguishable from the air, and preferably distinguishable as by color from the first series of markers, is also placed at the edge of the field in line with boundaries between adjoining parallel strips. One second marker is positioned between each adjacent pair of said first series of markers so that an alternating pattern of markers of the first and second series is created. With this pre-established marker system in place, the pilot traverses pre-selected boundaries between adjoining strips. The particular boundaries to be traversed are located from the air with reference to at least the markers in said first series. The path may be along boundaries aligned with the markers of the first series or along boundaries that are a particular distance from such aligned markers. On a subsequent day the same chemical is again applied by traversing boundaries located from the air with reference to at least the markers in said second series.

There are many variations in the method of determining the boundary to be traversed, including the use of additional series of markers and locating boundaries positioned between markers. These variations will be discussed hereinafter. Common to all of the variations is the concept of moving the aircraft along the appropriate boundary at a sufficient altitude above the strips so that at least the two adjoining strips defining the boundary being traversed are substantially covered when the chemicals are discharged from the aircraft. In this way a planned overlap in these areas of treatment occurs when prescribed boundaries are traversed on a sequence of occasions.

In the preferred embodiment, the amount of agricultural chemical applied on any one occasion is regulated so that at least two days of application are required to distribute a concentration of the chemical sufficient to treat and control the situation for which the chemical is being applied.

The above techniques of the present method give rise to a considerable number of advantages over all prior ways of applying chemicals from the air. In the present method coverage of the entire area is achieved on each day of application, but the concentration of chemical per unit area will be one-half, one-third, etc., of that previously achieved by prior techniques, depending on the type of program laid out, the number of strips the field is divided into, and the number of strips covered with each traverse across the field. The concentration previously sought is now obtained only after two or more days of treatment. However, since the cost of operation is based upon the volume of chemicals delivered and the distance covered by the aircraft, the cost for the plurality of treatments to achieve the same concentration of chemical per unit area will be the same with the present method as before. Nevertheless, because many of the agricultural chemicals are not indefinitely persistent, treatment of the field with a proportion of the dosage required for full treatment, but repeated on several occasions to make up the total dose, will give better control than a one-shot treatment with the full dose. With most of the agricultural chemicals in use, a small quantity that is applied and frequently replenished is better than an infrequent larger dose. Thus, with the present techniques, some chemical is kept on site at all times. With the more frequent repetitive approach contemplated the time period between treatments in which no control at all would exist is avoided. Again, it is to be noted that this repetitive process can be obtained at the same cost as the prior one-shot saturation techniques.

With the more frequent treatment at shorter intervals, any necessity for a change in the chemical being applied can be determined and promptly instituted. For example, if resistance develops to one type of fungicide that is being applied, the time to the next treatment is very short under the present system and a more effective chemical is more quickly brought to the scene. Because the present frequent treatment plan is more effective and subject to modification more rapidly, it is possible to use more mildly reacting chemicals without undue risk. If the mildest treatment does not appear to be giving adequate control, little time is lost before a more appropriate chemical is applied.

Delays caused by weather, personnel vagaries, and equipment breakdown are now far less critical than previously. For example, if under the old system treatment was given every 12 days, and a one-half dose is given every 6 days under the present method, the problem of being one day late is of far less concern under the present system. Now the treatment would occur following only 7 days from the previous treatment, whereas under the old system the treatment would not occur until the 13th day. With the longer period, 1 or 2 days late in timing may be such as to nullify the value of the treatment because the condition to be treated may have proceeded too far.

All problems of record keeping are now obviated. Semi-permanent stake markers in the ground serve as a lasting record immediately available to all concerned. The only matter that need be recorded is which marker series was utilized for guidance on the previous application so that the next marker series that should be utilized for application can be determined.

From a safety standpoint, advantages are obtained in that personnel are not required in the field and there is no avoidance problem for low flying aircraft. Moreover, since the airplane itself must be flown higher to cover more surface area in the present system, a safety factor to the pilot in terms of mechanical problems is obtained.

With the prevalent use of toxic agricultural chemicals and the requirements by various regulative bodies as to concentration that is permissible for use with a given crop, the present system represents a significant advance. Under prior techniques where the entire dose was applied on one occasion, any overlap in traversal paths could lead to an overtreatment and destruction of the crop from the standpoint of availability for human consumption. Since the present invention contemplates something less than the total desired dose on any one occasion, an inadvertent overlap on any one day of application will not result in an over treatment. Moreover, with the present marker system the chance for an error by way of repetition of aerial treatment is substantially eliminated. In addition, because a relatively smaller quantity of chemical is applied to the field at any one time, it may be possible to harvest the crop in a shorter period of time from the last time of treatment than before.

With respect to the accompanying drawings, a typical plan of operation is illustrated in FIG. 1. Here a field 10 containing a crop to be treated with an aerial application of agricultural chemicals is suitably measured or divided so as to be establish a plurality of parallel strips 11, 11', 11'', 11''', etc. A first series of markers 12, 12a, 12b are positioned on a side of field 10 in line with boundaries between adjoining parallel strips. Thus, marker 12 is placed in line with boundary 13 between strips 11 and 11'. A second series of markers 13, 13a, 13b are also positioned at boundaries between adjoining strips. Members in the second series are disposed with one marker of the second series equidistantly between adjacent ones of the first series. Thus, marker 13 is disposed equidistantly between markers 12 and 12a of the first series.

With reference to FIG. 4, a suitable type of marker is illustrated which may comprise a rigid support stake 14 that is inserted in the field, such as field 10. At the upper end, a suitable material is attached that will be easily observable and distinguishable from the air. In the preferred embodiment, a length of colored plastic such as surveyor's tape 15 is suitably bunched and fastened to the top portion of stake 14. Preferably the material should be movable with air currents so that a fluttering occurs, since such movement is easily spotted from the air against the stationary condition of the ground and crops nearby. In the preferred embodiment, the surveyor's tape, such as tape 15, is a different color for the first series of markers than for the second series of markers. For example, if in FIG. 1 markers 12, 12a, 12b are red, markers 13, 13a and 13b should be yellow. In this way, the pilot can easily differentiate between the path he has just traversed and the one he is scheduled to next traverse.

Returning to FIG. 1, on the initial day of application the aircraf may take the path designated No. 1 and shown in dotted lines. The aircraft is flown at a height sufficient so that while traversing path No. 1, for example along boundary 13, when the chemical is discharged both adjoining strips 11 and 11' will be covered and will receive a substantially equal share of the chemical. The amount of chemical discharged in this example along boundary 13 is the same as that which would have been previously distributed on strip 11 alone by flying the aircraft down the center of strip 11 at a much lower altitude so that only strip 11 was covered. Thus, the aircraft will have covered both strips 11 and 11' in the same time and distance and with the same amount of chemical as would have been previously applied at only strip 11, The procedure is repeated across the field. On its next pass the aircraft is aligned with marker 13 and chemical is applied to both strip 11'' and 11''' and so forth along the entire path designated No. 1.

On a subsequent day following this first application, the aircraft is flown with the same chemical along the path designated No. 2. In this case since no markers are present in line with the boundaries to be traversed, the pilot of the aircraft aligns himself by positioning the aircraft equidistantly between adjacent markers such as markers 12 and 13. On this pass the aircraft is again flown at an altitude sufficient to provide coverage of both adjoining strips along the path such as strips 11' and 11''. The same amount of chemical is applied as before. Now it will be appreciated that substantially all of the strips in the field will have received a second application equal to that received the first time, since there is a substantially complete overlap of all of the strips in the field. In this way the field has received a complete treatment, but on two separate occasions of one-half dosage each. At all times, the pilot of the aircraft has fixed points of reference so that a thorough and uniform application is easily achieved without missing areas and duplicating others.

It will be appreciated that markers can be placed at both ends of the boundary line as desired for additional guidance purposes. With long fields it may also be advantageous to place markers between the markers on the edges of the field. In addition, although the path has been illustrated in which chemicals were applied most efficiently from both directions, it may be that wind and other local conditions will dictate that the pilot must double back and only apply when traversing the field in one direction. The principle of guidance with markers and overlap of adjoining strips will nevertheless be the same.

In FIG. 2, an alternative to the marker system is illustrated. In this case a third series of markers 16, 16a, 16b, 16c, 16d, 16e have been positioned so that one marker of this third series is between adjacent mixed pairs of the first and second marker series of FIG. 1. Thus, marker 16 is between markers 12 and 13. In this case, the aircraft on the initial day of application flies the path illustrated in FIG. 1 and designated No. 1 in FIG. 2 by aligning and traversing the field with reference to each of the markers of both series 1 and 2. On the subsequent day of application the aircraft traverses path No. 2, shown in FIG. 2. In this case the aircraft is aligned with the boundaries marked by the third series of markers 16, 16a–16e in consecutive order and flies the boundaries so marked. The essential difference from the path illustrated in FIG. 1 is that the pilot has markers to align himself with in this embodiment, whereas in the embodiment of FIG. 1 he must fly paths visually determined by estimating distances from markers on either side of the desired path.

FIG. 3 provides some indication of the many types of variations contemplated. In this embodiment, the field for treatment is again divided into a plurality of parallel strips of substantially equal width. In this case, however, an application on three occasions is to be used to equal one full dosage for the field. To carry out this program, three series of markers are utilized. A first series of markers 17, 17a, 17b, 17c, 17d, 17e are positioned at the ends of every third boundary as indicated. Adjacent thereto a second series of markers preferably distinguishable by color from the first series are inserted and identified with numbers 18, 18a, 18b, 18c, 18d. Adjacent thereto a third series of markers distinguishable preferably by color from both the first and second series is installed as indicated at 19, 19a, 19b, 19c, 19d.

The aircraft on the initial occasion traverses path No. 1 by flying in order the boundaries marked by the first series of markers 17–17e. The aircraft is flown at a height sufficient to cause the chemical to treat, a width equal to about three adjoining strips on the field. Assuming normal practice would be to use the particular agricultural chemicals under consideration at 12 day intervals if a full dosage was applied each time, in this case the application would be made every 4 days and spread over three times the area. On the second application four days from initial application, path No. 2 would be flown along the boundaries marked by the second series of markers 18–18d. Again, the aircraft height is selected so that a swath equal to the width of three adjoining strips is covered. Finally, 8 days subsequent to the first day of application, path No. 3 is flown by reference to the boundaries in line with third marker series 19–19d. Since the area of treatment is again the width of three strips, each unit area of the field will have been covered with a one-third dosage so that the total amount of chemical is the same as that applied under prior techniques where the entire dose would be applied to each strip in the field all at one time every 12 days. However, the many advantages described hereinafter are now achieved while eliminating the serious shortcomings of the prior techniques.

Although the foregoing invention has been described in some detail by way of illustration and example for purposes of clarity of understanding, it is understood that certain changes and modifications may be practiced within the spirit of the invention as limited only by the scope of the appended claims.

What is claimed:
1. An improved method for the aerial application of agricultural chemicals to a field comprising establishing a plurality of parallel strips of substantially uniform width on a field; establishing a first series of markers distinguishable from the air at the ends of selected boundaries between adjoining parallel strips; establishing a second series of markers distinguishable from the air at the ends of boundaries between adjoining parallel strips, arranged so that one of said second series of markers is between each pair of adjacent markers in said first series of markers; and applying an agricultural chemical to said strips from an aircraft by traversing strip boundaries located from the air with reference to at least said first series of markers on an initial day of chemical application, and thereafter applying the same chemical on a subsequent day by traversing with an aircraft boundaries located from the air with reference to at least said second series of markers; the boundaries located with reference to said second series of markers being different than those boundaries located with reference to said first series of markers; said agricultural chemical being applied from said aircraft by maintaining said aircraft at a sufficient altitude above said strips so as to substantially cover at least the two adjoining strips defining the boundary being traversed when the chemicals are discharged from the aircraft; the amount of agricultural chemical discharged being regulated so that said initial day of application and at least one subsequent day of application are required to distribute a chemical concentration on the strips sufficient for treatment and control of the situation for which the chemical is being applied.

2. A method in accordance with claim 1 wherein said first series of markers is visually distinguishable from said second series of markers by differences in color.

3. A method in accordance with claim 2 wherein said first and second series of markers comprise a plurality of stakes insertable in the field, each having a flag on the upper end that is movable by air currents, and wherein said flag includes distinguishing coloration.

4. A method in accordance with claim 1 wherein said boundaries are located for traversal on said initial day by flying said aircraft along paths in line with selected ones of said markers, and wherein said boundary is located for traversal on the subsequent day by flying said aircraft along paths between members of said first and second series of markers.

5. A method in accordance with claim 1 and including the step of establishing a third series of markers distinguishable from the air at ends of selected boundaries between adjoining parallel strips and wherein the members of said third series of markers are each located between a member of each of said first and second series of markers, said application on said initial day being executed from an aircraft which traverses boundaries in line with said first series of markers, and said application on said subsequent day being executed by traversing boundaries in line with said third series of markers.

References Cited

UNITED STATES PATENTS

| 2,736,991 | 3/1956 | Schumacher et al. | 47—58 |
|---|---|---|---|
| 2,941,753 | 6/1960 | Ripper. | |

OTHER REFERENCES

GRASS—The Yearbook of Agriculture, 1948, U.S. Government Printing Office, Washington, D.C., p. 533 relied on.

ROBERT E. BAGWILL, *Primary Examiner.*